United States Patent
Tsengas

(10) Patent No.: US 7,234,420 B1
(45) Date of Patent: *Jun. 26, 2007

(54) PET CHEW TOY

(76) Inventor: Steven Tsengas, 1300 East St., Fairport Harbor, OH (US) 44077

( * ) Notice: Subject to any disclaimer, the term of this patent is extended or adjusted under 35 U.S.C. 154(b) by 0 days.

This patent is subject to a terminal disclaimer.

(21) Appl. No.: 11/318,935

(22) Filed: Dec. 27, 2005

Related U.S. Application Data

(62) Division of application No. 10/755,160, filed on Jan. 12, 2004, now Pat. No. 7,032,541.

(51) Int. Cl.
*A01K 29/00* (2006.01)
(52) U.S. Cl. ..................................... 119/710
(58) Field of Classification Search ............. 119/709, 119/710, 711; 426/94, 143, 279
See application file for complete search history.

(56) References Cited

U.S. PATENT DOCUMENTS 5,634,436 A * 6/1997 Coombs et al. ............. 119/707
5,865,147 A * 2/1999 Rubin ........................ 119/711
6,379,725 B1 * 4/2002 Wang et al. .................. 426/72
6,484,671 B2 * 11/2002 Herrenbruck ............... 119/707
7,032,541 B1 * 4/2006 Tsengas ...................... 119/710

* cited by examiner

*Primary Examiner*—Thomas Price
(74) *Attorney, Agent, or Firm*—John D. Gugliotta

(57) ABSTRACT

A pet chew toy for holding consumable treats comprises a body member having a plurality or ribs and a plurality of interstitial spaces formed between the ribs. The ribs and spaces cooperatively act to impinge a treat or treats inserted therein. The ribs and spaces may be disposed substantially parallel to the direction of the bore and a central axis, or may be disposed helically about the bore. The bore may be enclosed at one or both ends by threaded caps, heat bonded caps, or a combination thereof. A sound module may be provided within the bore for emitting a prerecorded or mechanically generated sound upon activation of the sound module.

8 Claims, 4 Drawing Sheets

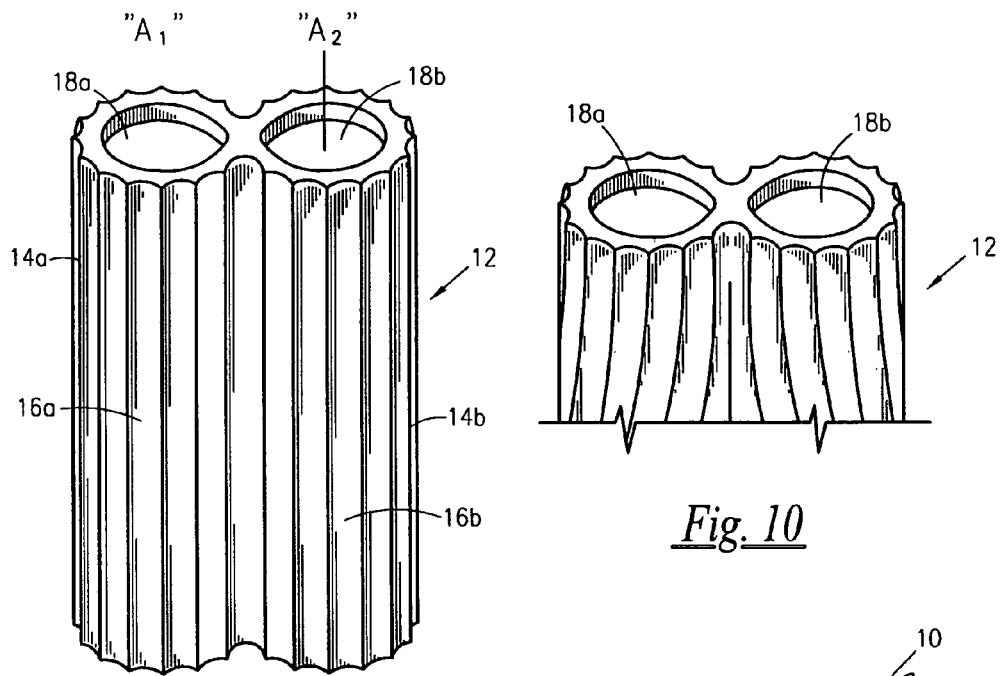
Fig. 9
Fig. 10
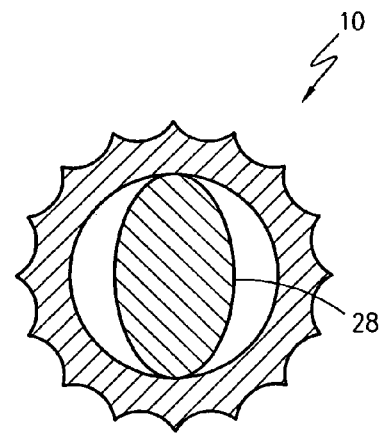
Fig. 11

PET CHEW TOY

RELATED APPLICATIONS

There present invention is a Divisional application of U.S. Ser. No. 10/755,160, filed on Jan. 12, 2004 now U.S. Pat. No. 7,032,541.

BACKGROUND OF THE INVENTION

1. Field of the Invention

The present invention relates generally to a pet toy and, more particularly, to a pet toy for holding consumable treats.

2. Description of the Related Art

There are many pet toys available that provide entertainment to the pet and the owner, including pet toys that dispense treats upon rolling or movement of the toy. However, these toys provide for the insertion of the treats into cavities within the toy and for dispensing based on movement or rotation of the toy. The present invention is markedly different by providing external ribs and spaces between the ribs for impinging the treats so that the pet may physically extract the treats. This provides exercise to the muscles, strengthens teeth and gums, and extracts harmful plaque from the teeth of a pet. These, among other disclosed advantages and features, overcome many of the deficiencies outlined and inherent within the known prior art.

A search of the prior art did not disclose any patents that read directly on the claims of the instant invention; however, the following references were considered related:

U.S. Pat. Nos. 6,557,496 and 6,484,671, each issued in the name of Herrenbruck, disclose a treat dispensing toy having an exit allowing treats to be dispensed;

U.S. Pat. No. 6,427,634, issued in the name of Mann, discloses a pet toy having a trapper cavity for insertion of an animal attactant;

U.S. Pat. No. 6,158,391, issued in the name of Simonetti, discloses a treat dispensing toy having a pair of spaced disk portions and structured to enable treats to be dispensed from an interior chamber when an animal causes rotation of the toy;

U.S. Pat. No. 5,956,182, issued in the name of Lindgren, discloses an animal chew and play toy and a treat container;

U.S. Pat. No. 5,947,061, issued in the name of Markham et al., discloses a pet toy product with integral treats receiving receptacles for removably holding one or more animal treats;

U.S. Pat. No. 5,553,570, issued in the name of Van Natter, III et al., discloses a disc-shaped animal retrieval toy having a treat container;

U.S. Patent Application Publication 2003/0096554 A1, in the name of Persall, discloses a multipurpose disc toy useful as a water and food dish for a pet; and U.S. Patent Application Publication 2003/0205206 A1, in the name of Natale et al., discloses a dog bone holder.

Consequently, there exists a continuous need for new ideas and enhancements for existing products in the pet toy industry.

SUMMARY OF THE INVENTION

It is therefore an object of the present invention to provide a pet chew toy for holding consumable treats comprising a body member with a plurality of ribs and a plurality of interstitial spaces therebetween, a consumable treat "T" inserted between adjacent ribs and into the space.

It is a feature of the present invention to provide a pet toy comprising a bore concentrically disposed to the ribs and spaces.

It is another feature of the present invention to provide a pet toy comprising ribs and spaces helically disposed about the bore.

It is another feature of the present invention to provide a pet toy comprising ribs and spaces directionally disposed parallel to the bore.

It is another feature of the present invention to provide a pet toy comprising at least one cap enclosing an end of the bore, the cap comprising either a threaded cap or a heat bonded cap.

It is another feature of the present invention to provide a pet toy comprising a first cap and a second cap enclosing each end of the bore, the caps comprising a pair of threaded caps, a pair of bonded caps, or a combination thereof.

It is another feature of the present invention to provide a pet toy comprising a sound module adhesively placed or heat bonded within the bore, the sound module transmitting a prerecorded or mechanical sound upon activation.

It is another feature of the present invention to provide a pet toy comprising a first bore and a second bore, each bore having a series of ribs and spaces disposed substantially parallel to the direction of the bore and central axis, or alternately, substantially disposed helically about the respective bores.

It is another feature of the present invention to provide a pet toy comprising a plurality of apertures formed in the body member for dispensing a flavored liquid, solid or semi-solid material and/or a scented aroma.

Briefly described according to one embodiment of the present invention, a pet chew toy for holding consumable treats comprises a body member having a plurality or ribs and a plurality of interstitial spaces formed between the ribs. The ribs and spaces cooperatively act to impinge a treat or treats inserted therein. The ribs and spaces may be disposed substantially parallel to the direction of the bore and a central axis, or may be disposed helically about the bore. The bore may be enclosed at one or both ends by threaded caps, heat bonded caps, or a combination thereof. A sound module may be provided within the bore for emitting a prerecorded or mechanically generated sound upon activation of the sound module.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 9 is a perspective view of another embodiment of the present invention comprising a first bore and a second bore parallelly disposed to the first bore, the ribs and spaces concentrically disposed about the respective bores; and FIG. 10 is a perspective view of another embodiment of the present invention comprising a first bore and a second bore parallelly disposed to the first bore, the ribs and spaces helically disposed about the respective bores; and FIG. 11 is a perspective top view of another embodiment of the present invention comprising a sound module placed within a bore.

DESCRIPTION OF THE PREFERRED EMBODIMENTS

Figures 1, 2:
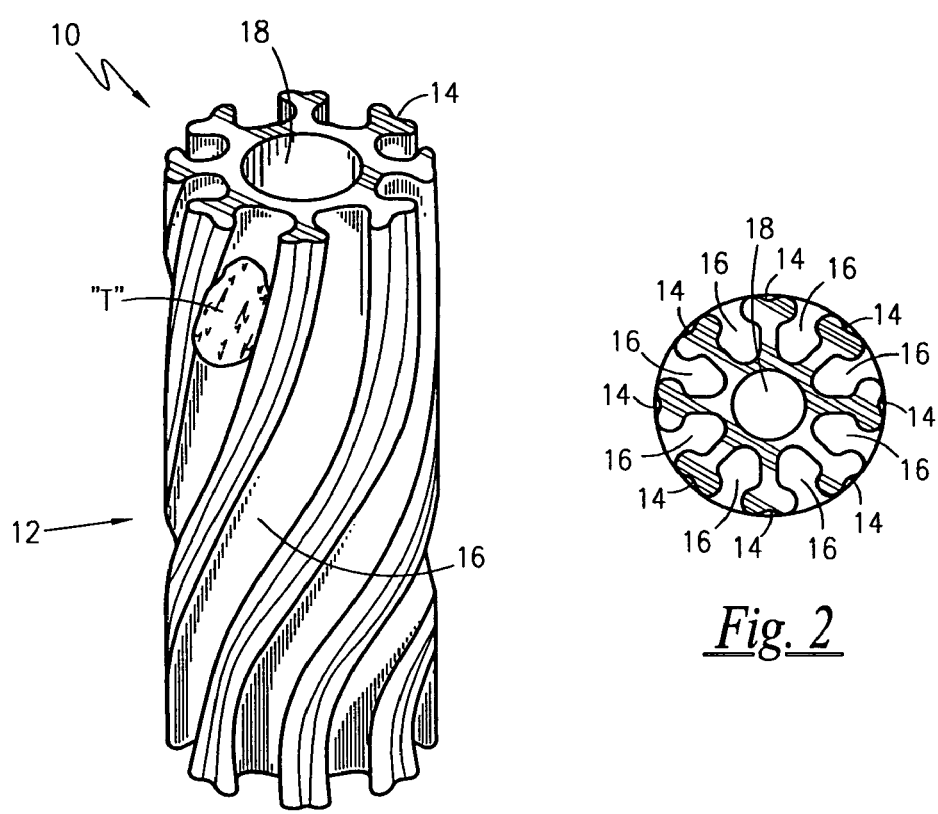
FIG. 1 is perspective view of a pet chew toy for holding consumable treats comprising a body member with a plurality of ribs and a plurality of interstitial spaces therebetween, a consumable treat "T" inserted between adjacent ribs and into the space, the ribs and spaces helically disposed about a bore.
FIG. 2 is a top view of the apparatus of FIG. 1.
Figure 3:
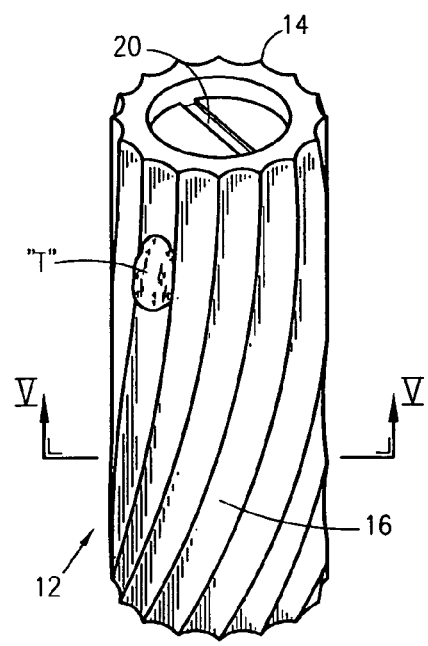
FIG. 3 is a perspective view of an alternate embodiment of the present invention having ribs and spaces helically disposed about a bore, and further having a cap for enclosing an end thereof.
Figure 4:
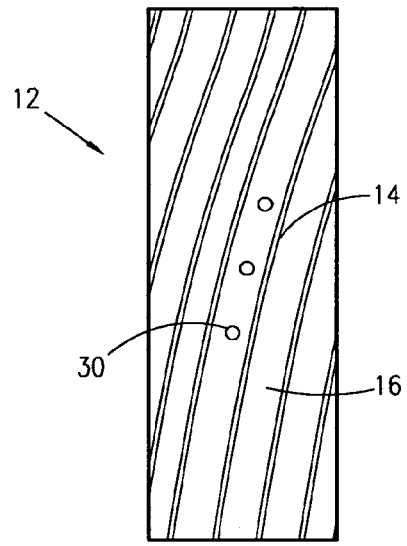
FIG. 4 is a side view of the apparatus of FIG. 3.

The best mode for carrying out the invention is presented in terms of its preferred embodiment, herein depicted within FIGS. 1 through 10.

1. Detailed Description of the Figures

Referring to FIG. 1 through FIG. 10, a pet chew toy for holding consumable treats 10, is shown in accordance to a preferred embodiment of the present invention. A pet chew toy 10 comprises an elongated body member 12 having a plurality of ribs 14 and a corresponding plurality of interstitial spaces 16 formed therebetween, the plurality of ribs 14 and the plurality of interstitial spaces 16 cooperatively impinging at least one of the consumable treats "T".

Figure 5:
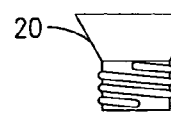
FIG. 5 is a cross-sectional view of the apparatus of FIG. 3 taken along line V—V of FIG. 3, FIG. 5 depicting an apparatus with a threaded cap enclosing one end and a heat bonded cap enclosing an opposite end.
Figure 5:
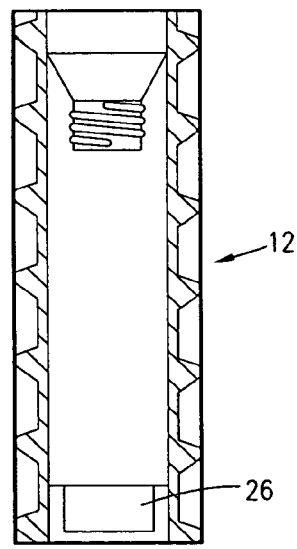
Figure 6:
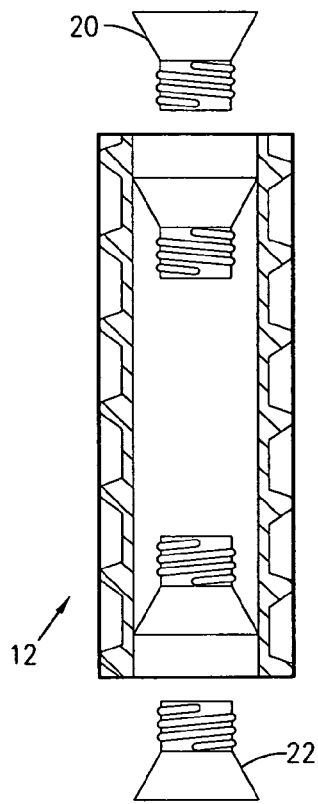
FIG. 6 is a cross-sectional view of an alternate embodiment of the apparatus depicted in FIG. 3 and FIG. 5, FIG. 6 depicting an apparatus with a pair of threaded caps enclosing both ends.
Figure 7:
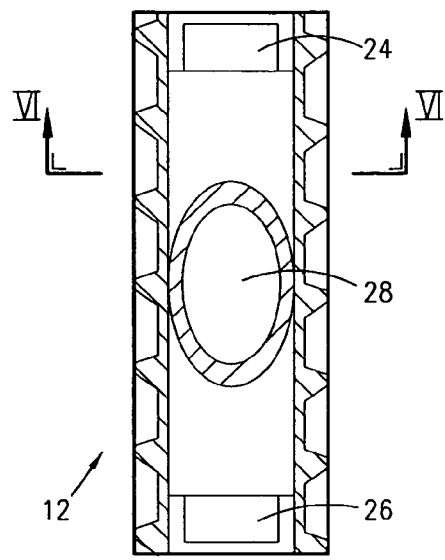
FIG. 7 is a cross-sectional view of another alternate embodiment of the apparatus depicted in FIG. 3 and FIG. 5, wherein each end is enclosed by a heat bonded cap, and further including a sound module within the bore providing pre-recorded or mechanically generated sounds upon activation.

The body member 12 comprises a bore 18 concentrically disposed to the plurality of ribs 14 and the plurality of interstitial spaces 16. The bore 18 may be used to impinge at least one of the consumable treats "T". As depicted in FIG. 5, FIG. 6 and FIG. 7, the bore 18 may be enclosed by threaded cap 20 (a first threaded cap) or a bond molded cap 24 at one end (a first bond molded cap). The bore 18 may also be enclosed by a second threaded cap 22 or a second bond molded cap 26 at an end opposite the first threaded cap 20 or first bond molded cap 24, respectively. A combination of threaded caps 20 or 22 and bonded caps 24 and 26 is also envisioned. The bore 18 may also house a sound module 28 adhered by known adhesives or heat bonded within the bore 18. The sound module 28 generates a prerecorded or mechanical sound upon activation, generally achieved by squeezing of the toy 10. The body member 12 may also comprise a plurality of apertures 30 formed in body member 12. The apertures 30 are provided for dispensing flavored liquid, solid or semi-solid material (such as a juice impregnated within the toy 10) and/or for dispensing scented aromas impregnated therein when the toy 10 is chewed and/or squeezed by a pet. The liquid, solid or semi-solid material used may be fortified with vitamins and minerals that the pet may be lacking in an ordinary dietary plan.

Figure 8:
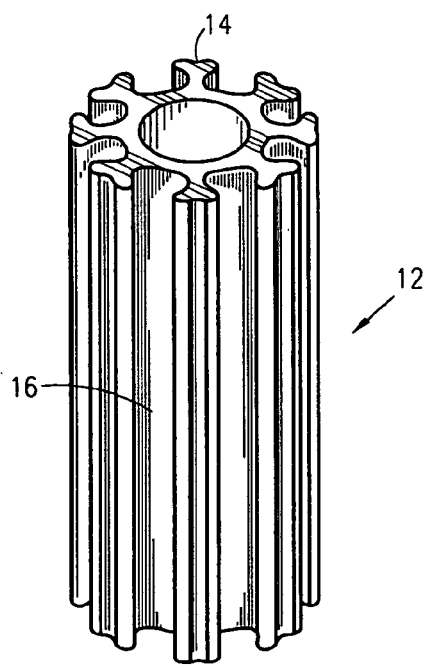
FIG. 8 is a perspective view of another embodiment of the present invention, the ribs and spaces directionally disposed parallel to the bore.

In one embodiment of the present invention, disclosed in FIG. 8, each one of the plurality of ribs 14 is substantially parallel to the direction or the bore 18 and a central axis "A1" of the body member 12. In another embodiment, disclosed in FIG. 1, FIG. 3 and FIG. 4, each one of the plurality of ribs 14 is substantially helical to a central axis "A1" of the body member 12.

In another embodiment of the present invention, disclosed as FIG. 9, the toy 10 comprises a first bore 18a and a second bore 18b parallelly disposed to the first bore 18a. The plurality of ribs 14 comprise a first series of ribs 14a and a first series of interstitial spaces 16a therebetween concentrically disposed about a central axis "A1" of the first bore 18a, and a second series of ribs 14b and a second series of interstitial spaces 16b therebetween concentrically disposed about a central axis "A2" of the second bore 18b. This embodiment may include a threaded cap or caps, bonded cap or caps, or a combination thereof for enclosing one or both ends of the bore 18.

In another embodiment of the present invention, disclosed as FIG. 10, the toy 10 comprises a first series of ribs 14a and a first series of interstitial spaces 16a therebetween helically disposed about a central axis "A1" of the first bore 18a, and a second series of ribs 14b and a second series of interstitial spaces 16b therebetween helically disposed about a central axis "A2" of the second bore. This embodiment may include a threaded cap or caps, bonded cap or caps, or a combination thereof for enclosing one or both ends of the bore 18.

The toy 10 is preferably manufactured via an extrusion molding process from an elastomeric product (such as thermoset or thermoplastic high tear strength material). The configuration of the present invention includes a number of protrusions (generally symmetrical to a central axis) which are likely to adhere or stick to a mold in another molding process, such as injection molding. The adhesion of the material to the mold results in increased costs and inefficient production, thus extrusion molding of the present invention is superior to other types of molding processes from a cost saving and efficiency concerned point of view.

The toy 10 is an effective training device for a pet, especially canines. The toy 10 may be employed as a retrieval toy that the canine may chase, retrieve and return to the owner. Because of the ribs 14 and interstitial spaces 16 provided, consumable treats "T" (such as appropriately proportioned food, kibble or treats) may be inserted therein, thus providing an incentive and reward to retrieve and/or obey commands. By impinging the treats "T" within the ribs 14 and spaces 16, the pet must exert energy to retrieve the treats "T", exercise jaw and head muscles, using the teeth and gums, thus the exercise in extracting the treat "T" from the toy 10 exercises muscles of the head and neck, and strengthens teeth and gums, and removes harmful plaque from the teeth and gumlines.

FIG. 11 shows a perspective top view of an embodiment of the present invention. A sound module 28 comprises a length that approximates the diameter of the inside of the bore so that it is secured between the opposing parts of the bore's circumference.

The toy 10 is envisioned as being adaptable for manufacture directed to variously sized animals, including the various breeds of canines. Thus, the toy 10 may be manufactured in sizes for small breeds, medium size breeds and large breeds, respectively. It is envisioned that the diameters may vary in a range from one inch to four inches, and that the lengths may vary in range from two inches to approximately twelve inches.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

To use the preferred embodiment of the toy 10, a user may load or impinge at least one or a plurality of consumable treats "T" between a adjacent ribs 14 and into an interstitial space 16 therebetween. The user may then place or throw the toy 10 for retrieval by a pet. The pet will exert energy in running after the toy 10, and will again exert more energy in extracting the treat(s) "T" from the toy 10. This sequence may be repeated as desired.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A pet chew toy comprising:
an elongated body member having a plurality of ribs and a corresponding plurality of interstitial spaces formed therebetween, said plurality of ribs and said plurality of interstitial spaces capable of cooperatively impinging at least one consumable treat, further comprising impregnating said body member with a scented aroma;
wherein said plurality of ribs comprise:
a first bore and a second bore parallelly disposed to said first bore;
a first series of ribs and a first series of interstitial spaces therebetween substantially disposed in a direction parallel to a central axis of said first bore;
a second series of ribs and a second series of interstitial spaces therebetween concentrically disposed about a central axis of said second bore; and
said body member impregnated with a liquid flavoring, said liquid flavoring dispensed through a plurality of apertures formed in said body member.

2. A pet chew toy comprising:
an elongated body member having a plurality of ribs and a corresponding plurality of interstitial spaces formed therebetween, said plurality of ribs and said plurality of interstitial spaces capable of cooperatively impinging at least one consumable treat;
wherein said plurality of ribs comprise:
a first bore and a second bore parallelly disposed to said first bore;
a first series of ribs and a first series of interstitial spaces therebetween substantially disposed in a direction parallel to a central axis of said first bore;
a second series of ribs and a second series of interstitial spaces therebetween concentrically disposed about a central axis of said second bore;
said body member impregnated with a liquid flavoring, said liquid flavoring dispensed through a plurality of apertures formed in said body member;
wherein said toy is formed by extrusion molding; and
wherein at least one of said bores is enclosed by a threaded cap.

3. The toy of claim 2, wherein at least one of said bores is enclosed by a first threaded cap at an end and by a second threaded cap at an opposite end.

4. The toy of claim 2, wherein at least one of said bores is enclosed by a bond molded cap.

5. The toy of claim 2, wherein at least one of said bores is enclosed by a first bond molded cap at an end and by a second bond molded cap at an opposite end.

6. The toy of claim 2, wherein at least one of said bores houses a sound module, said sound module generating a prerecorded sound upon activation.

7. The toy of claim 6, wherein said sound module is adhered to said bore.

8. The toy of claim 6, wherein said sound module is heat bonded to said bore.

* * * * *